(12) United States Patent
Gu et al.

(10) Patent No.: US 8,284,342 B2
(45) Date of Patent: Oct. 9, 2012

(54) LIQUID CRYSTAL DISPLAY DEVICE AND BACKLIGHT DEVICE THEREOF

(75) Inventors: Seungman Gu, Kyungbuk (KR); Jaewoo Jo, Chungnam (KR)

(73) Assignee: LG Display Co., Ltd., Seoul (KR)

( * ) Notice: Subject to any disclaimer, the term of this patent is extended or adjusted under 35 U.S.C. 154(b) by 868 days.

(21) Appl. No.: 12/318,534

(22) Filed: Dec. 30, 2008

(65) Prior Publication Data

US 2009/0213064 A1    Aug. 27, 2009

(30) Foreign Application Priority Data

Feb. 27, 2008 (KR) .......................... 10-2008-0017996
Apr. 25, 2008 (KR) .......................... 10-2008-0039048

(51) Int. Cl.
    *G02F 1/1333*      (2006.01)
    *G02F 1/1335*      (2006.01)

(52) U.S. Cl. ............ 349/58; 349/61; 362/632; 362/633; 362/634

(58) Field of Classification Search .................... 349/58, 349/61; 362/632–634
See application file for complete search history.

(56) References Cited

U.S. PATENT DOCUMENTS

| | | | |
|---|---|---|---|
| 2006/0209228 A1* | 9/2006 | Nishida ............................ | 349/59 |
| 2007/0035223 A1* | 2/2007 | Yoo et al. ......................... | 313/27 |
| 2007/0093165 A1* | 4/2007 | Komatsu et al. ................. | 445/23 |

\* cited by examiner

*Primary Examiner* — Nathanael R Briggs
(74) *Attorney, Agent, or Firm* — Morgan, Lewis & Bockius LLP

(57) ABSTRACT

A liquid crystal display device includes a liquid crystal display panel, a plurality of light sources for irradiating onto the liquid crystal display panel, at least two electrode boards at ends of each of the light sources for electrically connecting the light sources, an inverter board aligned parallel to the light sources for providing drive signals to the light sources through the electrode boards, and a first cover for accommodating the liquid crystal display panel, the light sources and the electrode boards on a first side thereof and for accommodating the inverter board on a second side thereof such that the inverter board is substantially on a same plane as a main portion of the cover.

20 Claims, 11 Drawing Sheets

LIQUID CRYSTAL DISPLAY DEVICE AND BACKLIGHT DEVICE THEREOF

This application claims the benefit of Korea Patent Application No. 10-2008-0017996 filed on Feb. 27, 2008 in Korea and Korea Patent Application No. 10-2008-0039048 filed on Apr. 25, 2008 in Korea, which are respectively incorporated herein by reference for all purposes as if fully set forth herein.

BACKGROUND OF THE INVENTION

1. Field of the Invention

The embodiments of the invention relate to a liquid crystal display device, and more particularly, to a slim-sized liquid crystal display device and a liquid crystal display device that maintains balance of a driving signal supplied to lamps in an accompanying light source.

2. Discussion of the Related Art

Generally, liquid crystal display devices are widely used due to advantageous characteristics of light weight, thin profile, and low power consumption. As a result, liquid crystal display devices are widely used in office automation equipment and audio/video equipment.

A liquid crystal display device includes a plurality of control switches arranged in a matrix and controls the amount of light being transmitted in accordance with a signal applied to the control switches, thereby generating a desired image. Because the liquid crystal display device is not a self luminous display device, it requires a separate light source, such as a backlight unit.

A backlight unit may be generally classified as a direct type and an edge type in accordance with the location of a light source. The edge type backlight unit has a light source along one side of a liquid crystal display device, and irradiates light from the light source to a liquid crystal display panel through a light guide plate and a plurality of optical sheets. The direct type backlight unit has a plurality of light sources disposed directly under a liquid crystal display panel, and irradiates light from the light sources to the liquid crystal display panel through a diffusion plate and a plurality of optical sheets. Recently, the direct type backlight unit is more often used in LCD TVs because it has improved brightness, more consistent light uniformity and better color purity, as compared to the edge type backlight.

A cold cathode fluorescent lamp (hereinafter, referred to as "CCFL") and an external electrode fluorescent lamp (hereinafter, referred to as "EEFL") may be used for a light source in a backlight unit. To drive the lamps, a power transmission control device called an inverter is utilized. The inverter is electrically connected to the lamps of the backlight unit and serves to amplify a voltage and to control a current so that a high voltage and an appropriate current can be delivered to the lamps.

Figure 1A:
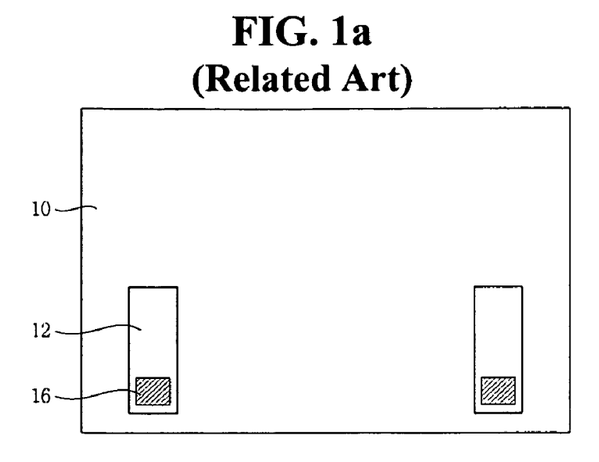
FIGS. 1a and 1b are views showing a two-board inverter according to the related art.
Figure 1B:
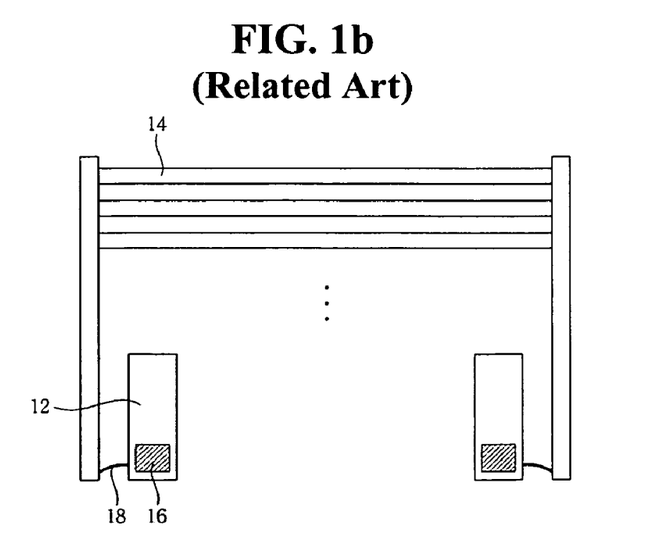

FIGS. 1a and 1b are views showing a two-board inverter according to the related art. As shown in FIGS. 1a to 1b, an inverter 12 is mechanically mounted to opposite sides of a back surface of a bottom cover 10. The bottom cover 10 accommodates lamps 14 and supplies a driving power to the lamps 14 through a lamp wire 18. A high-capacity transformer 16 and a plurality of passive devices (not shown) are mounted on a printed circuit board (hereinafter, referred to as "PCB") of the inverter 12. The transformer 16 is a means for raising/reducing an input voltage by the turn ratio of primary coil and secondary coil that are wound around an iron core, and occupies a relatively large volume compared to the other passive devices. In particular, the inverter 12 and the PCB are arranged perpendicularly to the lengthwise dimension of the lamps 14. Also, the inverter 12 projects from the back surface of the bottom cover 10 to the mounting height of the transformer 16, which acts as a limitation in realizing a slim liquid crystal display device. Further, because the inverter 12 is arranged at both sides of the back surface of the bottom cover 10 (two-board inverter), space for a mountable space of a system module, such as a digital board or power board, is restricted and reduced.

Figure 2A:
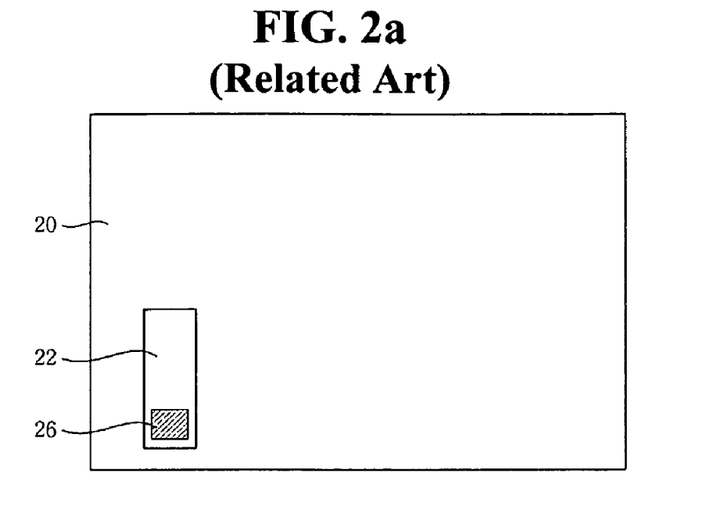
FIGS. 2a and 2b are views showing an one-board inverter according to the related art.
Figure 2B:
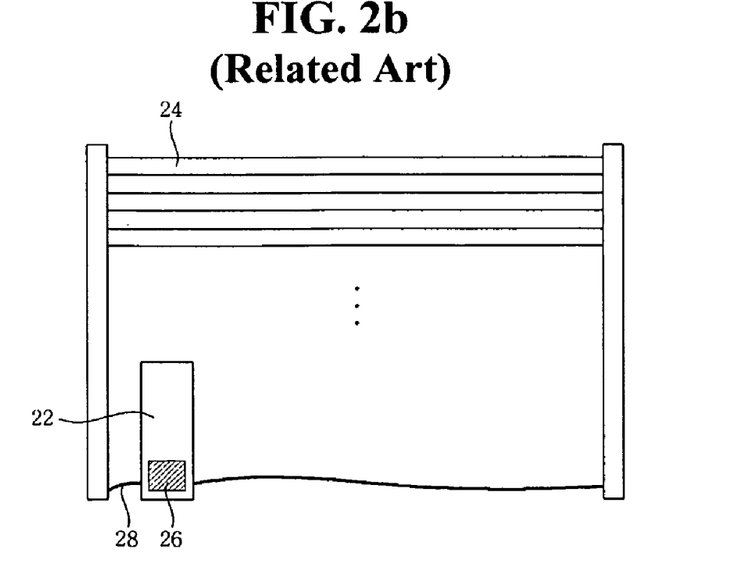

FIGS. 2a and 2b are views showing a one-board inverter according to the related art. To increase the mountable space of the system module, a one-board inverter method has been proposed as shown in FIGS. 2a and 2b. In FIGS. 2a and 2b, an inverter 22 is mechanically mounted to a lateral side of the back surface of a bottom cover 20. The bottom cover 20 accommodates lamps 24 and supplies a driving power to the lamps 24 through a lamp wire 28. A high-capacity transformer 26 and a plurality of passive devices (not shown) are mounted on a printed circuit board (hereinafter, referred to as "PCB") of the inverter 22. In particular, the inverter 22 and the PCB are arranged perpendicular to the lengthwise dimension of the lamps 24. The one-board inverter method has a fatal disadvantage in that because the inverter 22 is arranged further toward either one side from both electrodes of the lamps 24, left and right balance of a driving current delivered to the lamps 24 is lacking. Further, this method has another limitation in realizing a slim liquid crystal display device because the inverter 22 still projects from the back surface of the bottom cover 20 to the mounting height of the transformer 26.

Moreover, when the inverter according to the related art projects from the back surface of the bottom cover, the possibility that an electromagnetic interference may occur between the inverter and the system module increases. Furthermore, because the inverter according to the related art is arranged adjacent to the electrodes of the lamps, heat generation of the inverter is increased by the lamp heat, thereby decreasing inverter efficiency.

SUMMARY OF THE INVENTION

Accordingly, embodiments of the invention are directed to a liquid crystal display device that substantially obviates one or more of the problems due to limitations and disadvantages of the related art.

An object of embodiments of the invention is to provide a liquid crystal display device that has slim profile by avoiding an increase in thickness due to an inverter.

Another object of embodiments of the invention is to provide liquid crystal display devices that preserves the mountable space for a system module and provides balance in driving signals.

Another object of embodiments of the invention is to provide liquid crystal display devices that reduce electromagnetic interferences between an inverter and a system module.

Another object of embodiments of the invention is to provide liquid crystal display devices that have improved inverter efficiency.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a liquid crystal display device include a liquid crystal display panel, a plurality of light sources for irradiating onto the liquid crystal display panel, at least two electrode boards at ends of each of the light sources for electrically connecting the light sources, an inverter board aligned parallel to the light sources for providing drive signals to the light sources through the electrode boards, and a cover for accommodating the liquid crystal display panel, the light sources and the electrode boards on a first side thereof and for accommodating the inverter board on a second side thereof such that the inverter board is substantially on a same plane as a main portion of the cover.

In another aspect, a backlight device for a flat panel display includes a plurality of light sources generating light irradiated onto the flat panel display, at least two electrode boards at ends of each of the light sources for electrically connecting the light sources, an inverter board aligned parallel to the light sources for providing drive signals to the light sources through the electrode boards, and a first cover for accommodating the flat panel display, the light sources and the electrode boards on a first side thereof and for accommodating the inverter board on a second side thereof such that the inverter board is substantially on a same plane as a main portion of the cover.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention. In the drawings.

DETAILED DESCRIPTION OF THE PREFERRED EMBODIMENTS

Reference will now be made in detail to embodiments which are illustrated in the accompanying drawings. Wherever possible, similar reference numbers will be used to refer to the same or similar parts.

Figure 3:
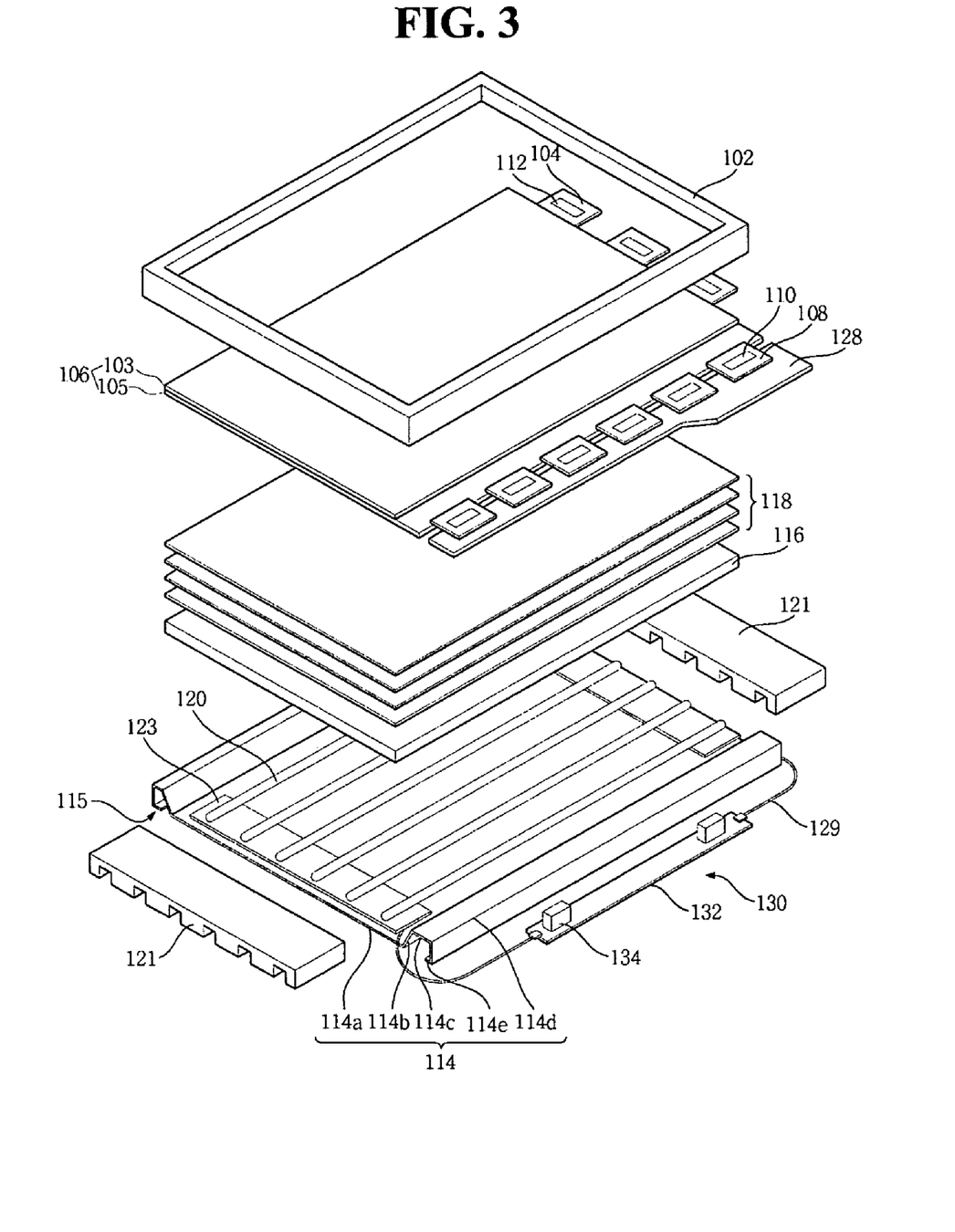
FIG. 3 is an exploded perspective view of a liquid crystal display device in accordance with an embodiment of the invention.
Figure 4:
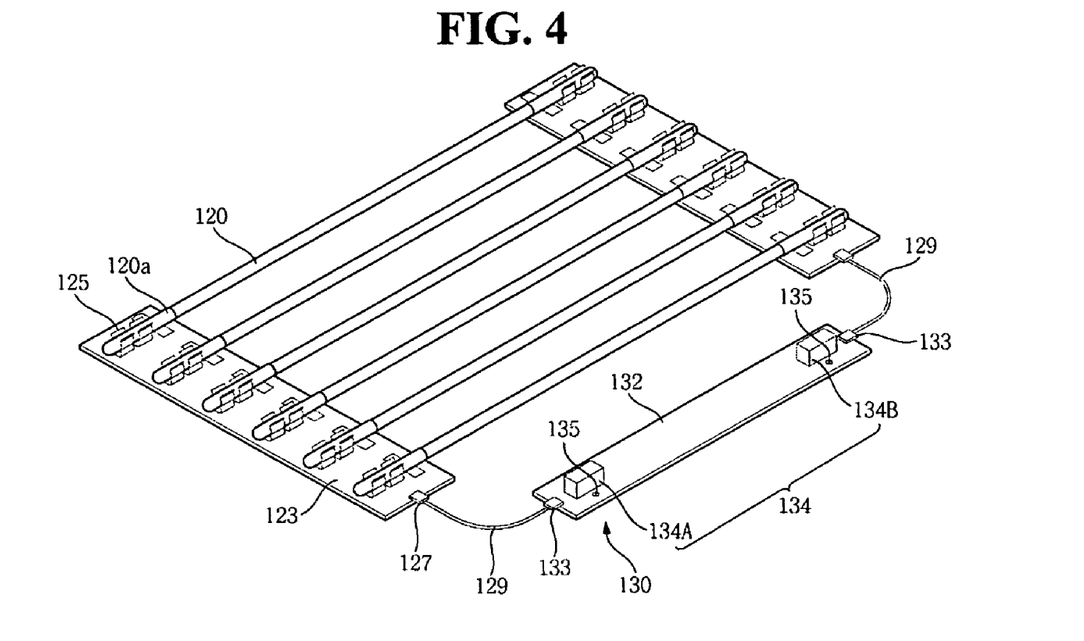
FIG. 4 is a view showing a lamp connection structure when an EEFL is implemented in accordance with an embodiment of the invention.

FIG. 3 is an exploded perspective view of a liquid crystal display device in accordance with an embodiment of the invention, and FIG. 4 is a view showing a lamp connection structure when an EEFL is implemented in accordance with an embodiment of the invention. Referring to FIGS. 3 and 4, a liquid crystal display device in accordance with an embodiment of the invention includes a top case 102, a liquid crystal display panel 106, a backlight unit, and an inverter 130.

The top case 102 covers the edges of the liquid crystal display panel 106. The liquid crystal display panel 106 includes an upper substrate 105 and a lower substrate 103. Liquid crystal materials (not shown) are formed between the upper substrate 103 and the lower substrate 105. The liquid crystal display panel 106 is provided with a spacer (not shown) for maintaining a constant gap between the upper substrate 103 and the lower substrate 105. The upper substrate 103 is provided with a color filter, a common electrode and a black matrix (not shown). The common electrode may be formed on the lower substrate 105 according to an electric field driving method. Signal lines, such as a data line and a gate line (not shown), are formed on the lower substrate 105. A thin film transistor (hereinafter, referred to as "TFT") is formed at a crossing of the data line and the gate line. The TFT switches a data signal to be transmitted from the data line to the liquid crystal cell in response to a scanning signal (i.e., a gate pulse) from the gate line. A pixel electrode is formed at a pixel area between the data line and the gate line.

One side of the liquid crystal display panel 106 is provided with data and gate pad areas connected to the data and gate lines, respectively. A plurality of tape carrier packages (hereinafter, referred to as "TCPs") 104 and 108 are attached to the data and gate pad areas. These TCPs 104 and 108 are divided into data TCPs 108, which are attached to a source PCB 128 supplying video signals to the data lines of the liquid crystal display panel 106 and to data pads on the lower substrate 105 and have data driving integrated circuits 110 mounted thereon for supplying video signals to the data lines in response to a control signal from the source PCB 128, and gate TCPs 104 which are attached to gate pads on the lower substrate 105 and have gate driving integrated circuits 112 mounted thereon for supplying gate signals to the gate lines in response to a control signal from the source PCB 128.

The backlight unit includes a plurality of lamps 120 arranged side by side, for irradiating light to the liquid crystal display panel 106, a guide support 121 for inserting the lamps 120 therein and covering the edges of the lamps 120, a bottom cover 114 arranged at the back surface of the lamps 120, for accommodating the lamps 120, a diffusion plate 116 arranged to cover the bottom cover 114, for diffusing the light generated from the lamps 120 and irradiating the light to the liquid crystal display panel 106, and a plurality of optical sheets 118 for vertically raising the traveling path of the light accumulated and incident on the diffusion plate 116 toward the liquid crystal display panel 106.

Each of the lamps 120 includes a glass tube and electrodes mounted on both end portions of the glass tube. The glass tube is filled with the inert gases, and a fluorescent substance is coated on the inner wall of the glass tube. The lamps 120 may include EEFLs having external electrodes 120a projecting at both opposite ends or CCFLs.

The bottom cover 114 includes a first surface 114a for mounting the lamps 120 and a common electrode board 123 thereon, a second surface 114b diagonally bent and extended from the first surface 114a, a third surface 114c bent and extended from the second surface 114b to be made parallel with the first surface 114a, a fourth surface 114d vertically bent and extended from the third surface 114a, and a fifth surface 114e vertically bent from the fourth surface 114d and extended between the first and third surfaces 114a and 114c to be made parallel with these surfaces 114a and 114c.

The second to fifth surfaces 114b, 114c, 114d, and 114e are formed at both long sides of the bottom cover 114 parallel to the lamps 120, and both short sides of the bottom cover 114 perpendicular to the lamps 120 are opened. The second to fifth surfaces 114b, 114c, 114d, and 114e form a recess 115 at the long sides of the upper and lower ends of the bottom cover 114. A side support 121 is mounted to the left and right short sides of the bottom cover 114. The side support 121 is provided with depressed and raised portions for inserting the lamps 121 therein, and supports the lamps 120 from both short sides of the bottom cover 114.

The diffusion plate 116 diffuses the light incident from the lamps 120, thereby making uniform the distribution density of the light irradiated on the liquid crystal display panel 106. The plurality of optical sheets 118 stacked on the diffusion plate 110 converts the light incident from the diffusion plate 116 to be perpendicular to the liquid crystal display panel 106, thereby improving light efficiency. The optical sheets 118 are typically comprised of two prism sheets and two diffusion sheets.

The inverter 130 includes an inverter PCB 132, a transformer 134 mounted on the inverter PCB 132, and a plurality of passive devices (not shown). The transformer 134 may be implemented in any one of an EI type transformer, a CI type transformer, and a U-shaped transformer.

Figure 6:
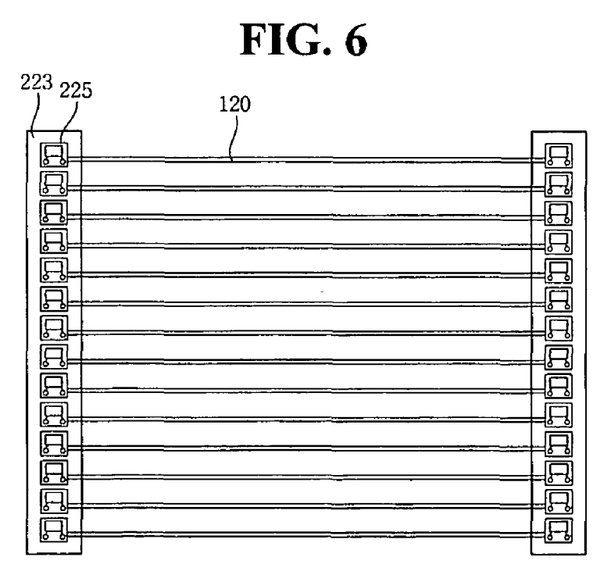
FIG. 6 is a view showing a lamp connection structure when parallel type CCFLs using balance capacitors are implemented in accordance with an embodiment of the invention.
Figure 7:
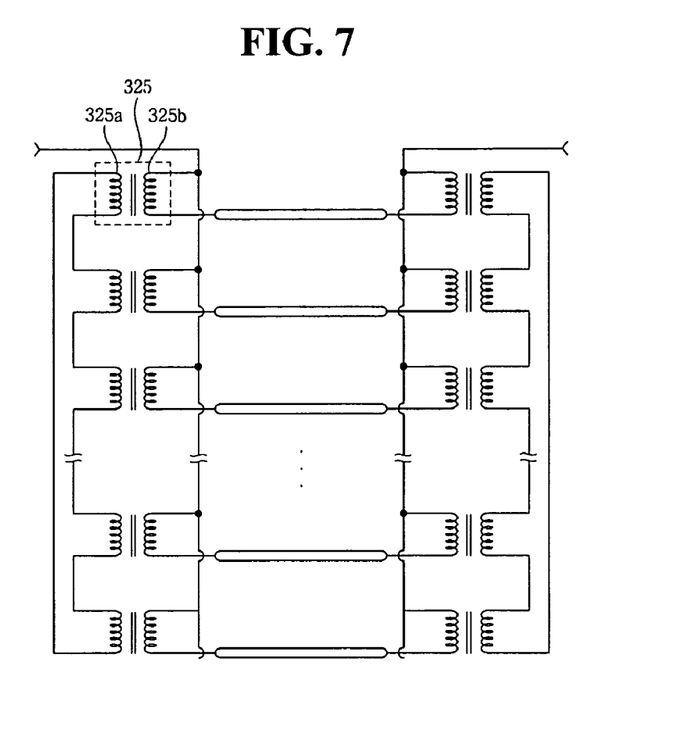
FIG. 7 is a view showing a lamp connection structure when parallel type CCFLs using balance transformers are implemented in accordance with an embodiment of the invention.

FIG. 6 is a view showing a lamp connection structure when parallel type CCFLs using balance capacitors are implemented in accordance with an embodiment of the invention, and FIG. 7 is a view showing a lamp connection structure when parallel type CCFLs using balance transformers are implemented in accordance with an embodiment of the invention. As shown in FIGS. 6 and 7, the lamps 120 may include parallel type CCFLs. In a CCFL, electrodes are formed inside a glass tube and parallel type CCFLs are implemented to apply a lamp driving power commonly to the lamps 120. In FIG. 6, parallel type CCFLs are implemented by a plurality of balance capacitors 225 connected to both end portions of the lamps 120, respectively, through a connector (not shown), and a balance board 223 for mounting the balance capacitors 225 thereon. The balance capacitors 225 serve as external electrodes, and they are commonly connected by being conducted to each other on the balance board 223. Therefore, the lamps 120 are able to commonly receive a lamp driving power from the inverter 130.

Furthermore, as shown in FIG. 7, the parallel type CCFLs are implemented by a plurality of balance transformers 325 connected to both end portions of the lamps 120, respectively. The balance transformers 325 serve as external electrodes, and primary coils 325a thereof are connected to each other in series to form a closed circuit, and secondary coils 325b thereof are connected to the end portions of the lamps 120. Therefore, a tube current flowing in the lamps 120 is controlled equally by the current flowing in the primary coils 325a through the closed circuit, thereby allowing the lamps 120 to commonly receive a lamp driving power from the inverter 130. These balance transformers 325 can be mounted on a balance board (not shown) like the balance capacitors 225 of FIG. 6.

Hereinafter, embodiments will be described under the assumption that lamps 120 are EEFLs for the convenience of explanation.

External electrodes 120a of the lamps 120 are commonly connected to each other on a common electrode board 123, and are supplied with a lamp driving power commonly through the common electrode board 123. For this, the common electrode board 123 is provided with metal clips 125 for pressing the external electrodes 120a of the lamps 120 by an elastic force to fit the lamps 120 thereto. These metal clips 125 may be mounted by a surface mount technology ("SMT") and soldered to be electrically connected to a power transmission line (not shown) formed on the common electrode board 123. The power transmission line formed on the common electrode board 123 supplies a lamp driving power from the inverter 130 to the lamps 120 through a connector 127 and a lamp wire 129.

Figure 5A:
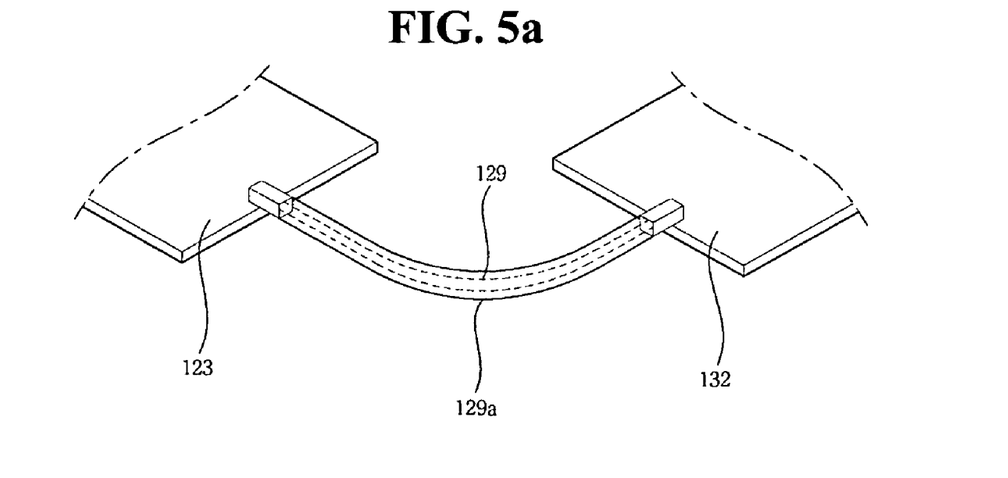
FIG. 5a is a view showing a lamp wire being covered with an insulation tube in accordance with an embodiment of the invention.

FIG. 5a is a view showing a lamp wire being covered with an insulation tube in accordance with an embodiment of the invention. As shown in FIG. 5a, the lamp wire 129 is covered with an insulation tube 129a to minimize the amount of signal leaked upon transmission of a lamp driving power. The insulation tube 129a may be formed of a rubber material or an electrical insulator material, and serves to reduce the amount of leakage capacitance by increasing the distance between the lamp wire 129 and the metal surface of the bottom cover 114 (shown in FIG. 3).

Figure 5B:
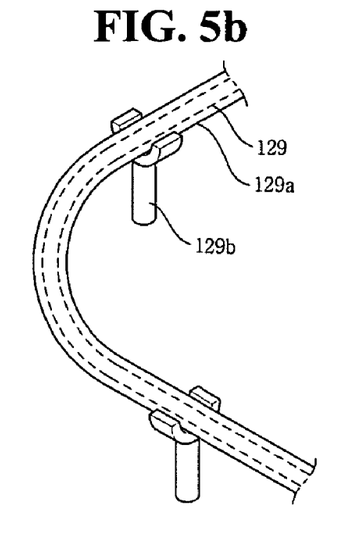
FIG. 5b is a view showing supports for supporting the lamp wire covered with the insulation tube in accordance with an embodiment of the invention.

FIG. 5b is a view showing supports for supporting the lamp wire covered with the insulation tube in accordance with an embodiment of the invention. As shown in FIG. 5b, to further increase the distance between the lamp wire 129 and the metal surface of the bottom cover 114 (shown in FIG. 3), the liquid crystal display device includes a plurality of supports 129b formed on the back surface of the bottom cover 114 corresponding to the lamp wire 129, and the lamp wire 129 covered with the insulation tube 129a may be supported by these supports 129b.

Figure 8:
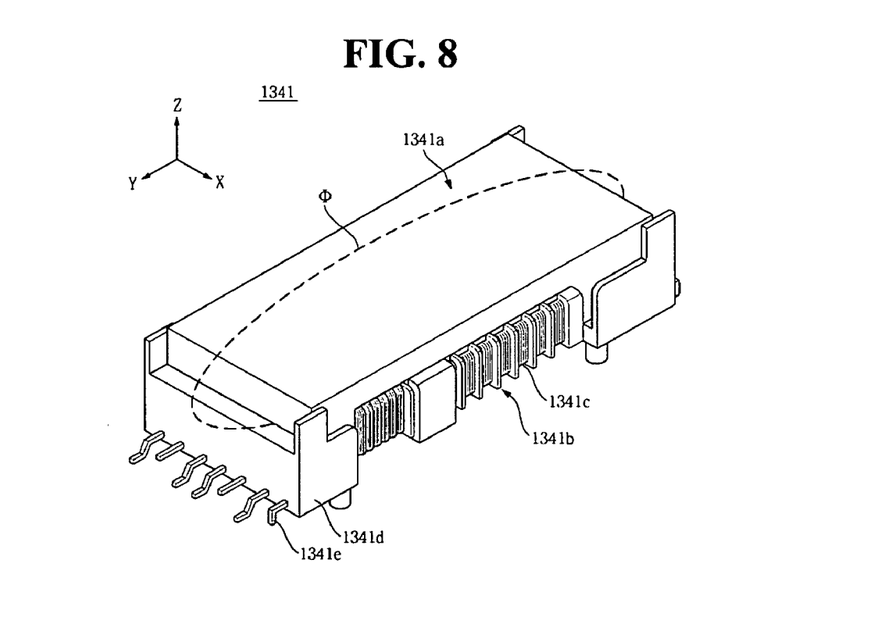
FIG. 8 is a perspective view showing an EI type transformer in accordance with an embodiment of the invention.
Figure 9:
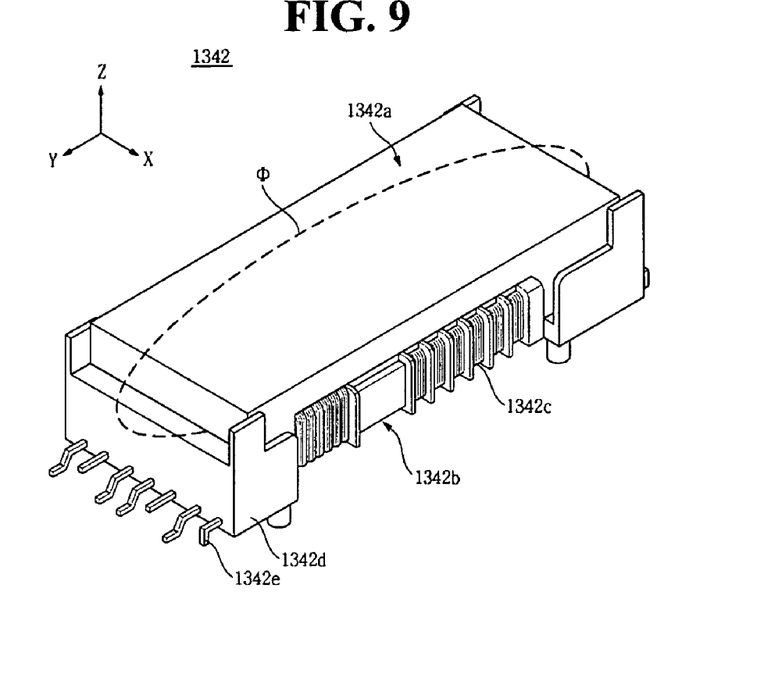
FIG. 9 is a perspective view showing a CI type transformer in accordance with an embodiment of the invention.
Figure 10A:
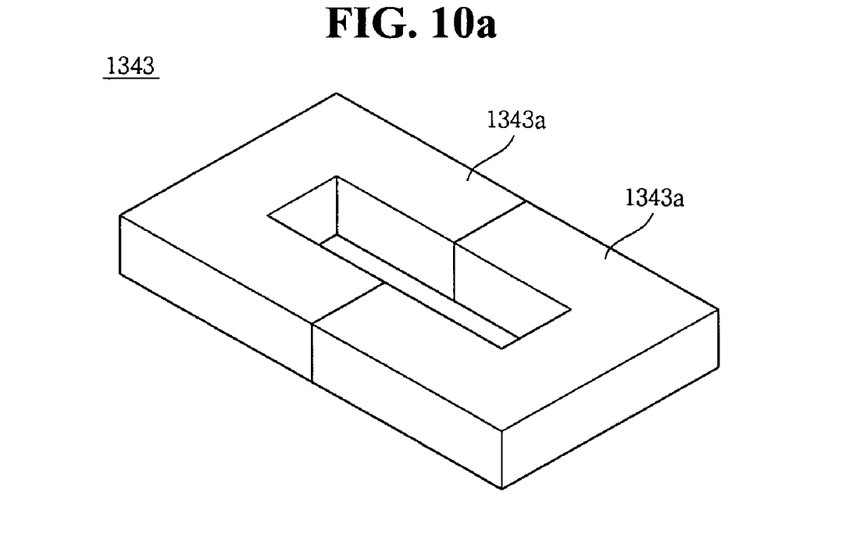
FIGS. 10a and 10b are perspective views showing a U-shaped transformer in accordance with an embodiment of the invention.
Figure 10B:
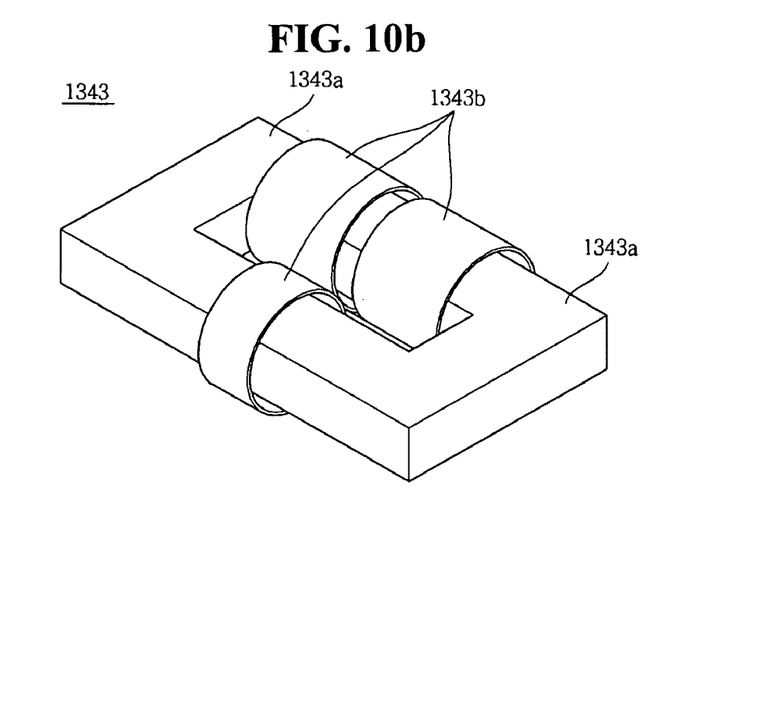

FIG. 8 is a perspective view showing an EI type transformer in accordance with an embodiment of the invention, FIG. 9 is a perspective view showing a CI type transformer in accordance with an embodiment of the invention, and FIGS. 10a and 10b are perspective views showing a U-shaped transformer in accordance with an embodiment of the invention. In FIG. 8, an EI type transformer 1341 includes an outer core leg 1341a having an "E"-like shape, a central core leg 1341b having an "I"-like shape, coils 1341c wound around first and second sides of the central core leg 1341b, a frame member 1341d for covering one side of the outer leg core 1341a, and electrodes 1341e connected through the frame member 1341d.

In FIG. 9, an CI type transformer 1342 includes an outer core leg 1342a having an "C"-like shape, a central core leg 1342b having an "I"-like shape, coils 1342c wound around first and second sides of the central core leg 1342b, a frame member 1342d for covering one side of the outer leg core 1342a, and electrodes 1342e connected through the frame member 1342d. In EI type and CI type transformers, a magnetic line of force Φ is generated only in a vertical direction (on the x-y-z space) of the upper and lower sides of the central core leg 1341b or 1342b. Therefore, unlike the conventional EE type transformer having one central core leg coupled between two "E"-shaped outer core legs, these transformers can resolve the problems of power loss or heat generation caused by a horizontal magnetic field by removing a magnetic line of force generated in a horizontal direction on the x-y surface.

Generally, it is known that a horizontal magnetic line of force has a large probability of increasing the amount of power consumption and causing heat generation by generating an unnecessary induction current. Further, the EI type or CI type transformer can have a higher interlink magnetic flux as compared to the conventional EE type transformer (unshielded) having the same number of coils, because the back surface of the outer core leg 1341a or 1342a is shielded as shown in the drawing. Therefore, when the EL type or CI type transformers are used, it is possible to obtain the same interlink magnetic flux as an unshielded transformer even with a smaller number of coils. Hence, thicker coils compared to those of the unshielded transformer can be used, resultantly acquiring the effects, such as reduction of winding resistance and reduction of heat generation.

As shown in FIGS. 10a and 10b, an U-shaped transformer 1343 includes a pair of "U"-like shaped outer core legs 1343a, coils 1343b wound around first and second sides of the pair of outer core legs 1343a, a frame member (not shown), and electrodes (not shown). The U-shaped transformer has the advantage that the manufacturing cost is less than that of the EI type or CI type transformer.

Referring to FIGS. 3 and 5, the transformer 134 may include one of the EI type, the CI type and the U-shaped transformer shown in FIGS. 8, 9, 10a and 10b. The transformer 134 include a pair of first and second transformers 134A and 134B of the same type, and mounted on the inverter PCB 132. More specifically, the first and second transformers 134A and 134B may be located end portions of the inverter PCB 132. The first transformer 134A may induce a lamp driving signal in a first phase, and the second transformer 134B may induce a lamp driving signal in a second phase opposite to the first phase. Moreover, the first transformer 134A and 134B may have coils wound in directions opposite to each other. The lamp driving signal of the first phase is supplied to one electrode of the lamps 120 via a connector 133 and a lamp wire 129, and the lamp driving signal of the second phase is supplied to the other electrodes of the lamps 120 via the connector 133 and the lamp wire 129. Preferably, to adjust the left and right balance of a driving current supplied to the lamps 120, the distance between the first transformer 134A and one end portions of the lamps 120 and the distance between the second transformer 134B and the other end portions of the lamps 120 should be equal to each other.

Figure 11:
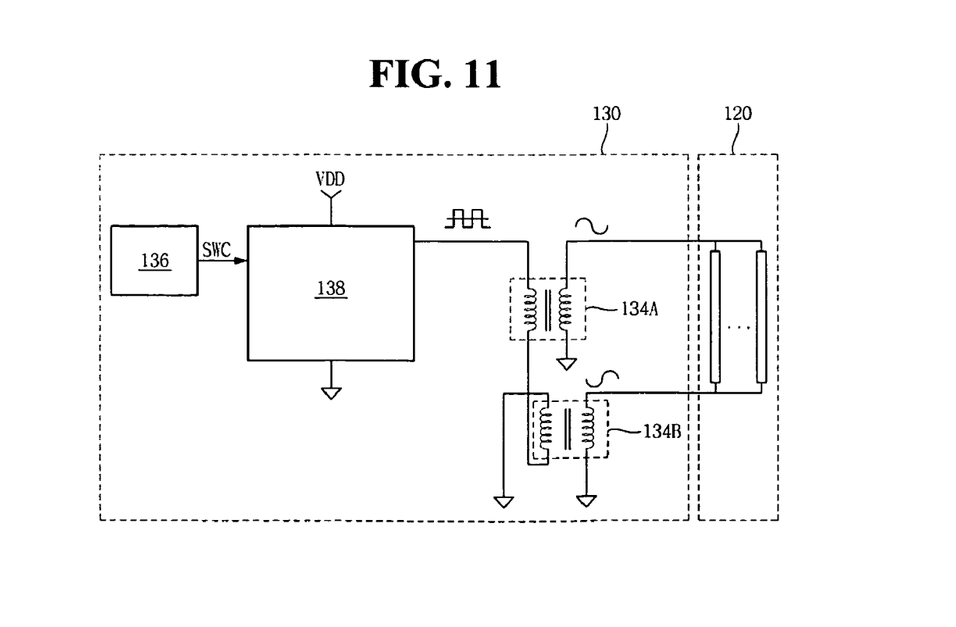
FIG. 11 is a schematic equivalent circuit diagram of an inverter having two transformers connected to each other in series in accordance with an embodiment of the invention.
Figure 12:
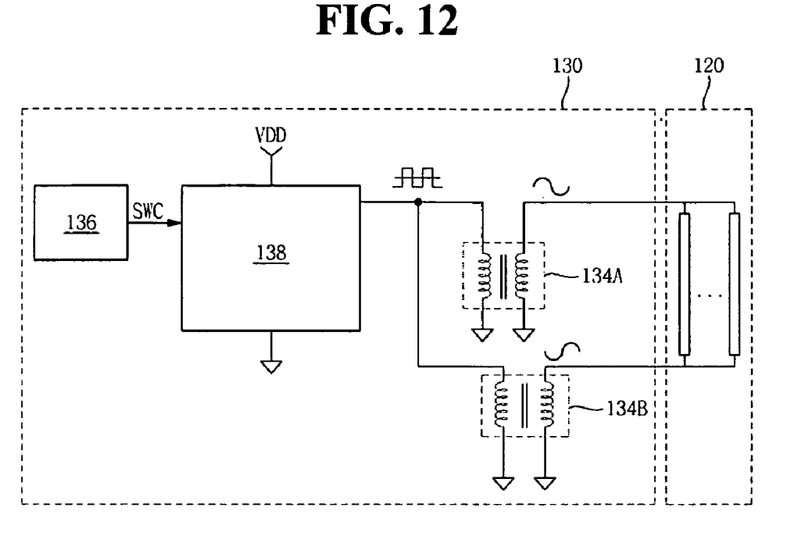
FIG. 12 is a schematic equivalent circuit diagram of an inverter having two transformers connected to each other in parallel in accordance with an embodiment of the invention.

FIG. 11 is a schematic equivalent circuit diagram of an inverter having two transformers connected to each other in series in accordance with an embodiment of the invention, and FIG. 12 is a schematic equivalent circuit diagram of an inverter having two transformers connected to each other in parallel in accordance with an embodiment of the invention. The first and second transformers 134A and 134B of this type can be serially connected to each other by a serial connection of the primary coils as shown in FIG. 11, or can be connected to each other in parallel by a parallel connection of the primary coils. In FIGS. 11 and 12, a control unit 136 may generate a switching control signal SWC by using a burst dimming signal generated from a dimming circuit (not shown). A switching unit 138 is provided with a plurality of field effect transistors, and is switched according to a switching control signal SWC and serves to convert a direct current signal VDD supplied from the outside into an alternating current signal and supply it to the first and second transformers 134A and 134B. Because the first and second transformers 134A and 134B are wound in directions opposite to each other, signals outputted through these transformers are in reverse phase to each other.

The inverter 130 may be provided with a plurality of screw holes 135 formed on the inverter PCB 132, for securing to the back surface of the bottom cover 114. The screw holes 135 are formed at ear portions (not shown) projecting from the second surface 114b of the bottom cover 114 toward the recess 115 and at positions corresponding to the fifth surface 114e of the bottom cover 114.

Figure 13:
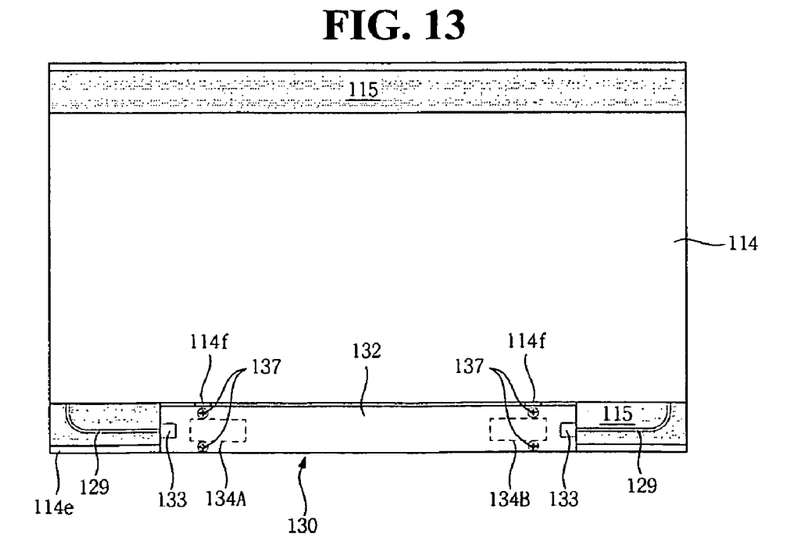
FIG. 13 is a plane view showing a coupling state between an inverter having two transformers and a bottom cover in accordance with an embodiment of the invention.
Figure 14:
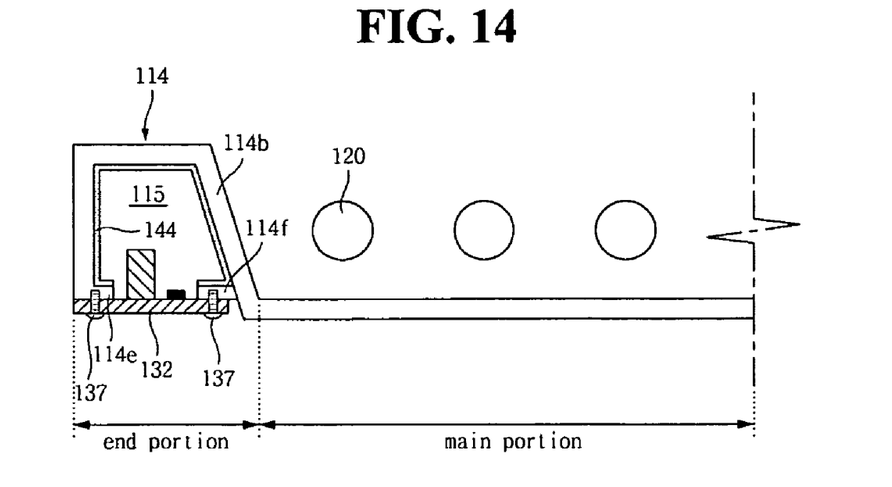
FIG. 14 is a cross-sectional view showing a coupling state between an inverter having two transformers and a bottom cover in accordance with an embodiment of the invention.

FIG. 13 is a plane view showing a coupling state between an inverter having two transformers and a bottom cover in accordance with an embodiment of the invention, and FIG. 14 is a cross-sectional view showing a coupling state between an inverter having two transformers and a bottom cover in accordance with an embodiment of the invention. Referring to FIGS. 13 and 14, the inverter 130 is mounted to the back surface of the bottom cover 114 by screws 137 penetrating through the screw holes 135 of the inverter PCB 132. To secure the screws 137, at least two ear portions 114f projecting toward the recess 115 while maintaining the same height as the fifth surface 114e are formed on the second surface 114b of the bottom cover 114. As described above, the recessed 115 is formed at the long sides of the upper and lower ends of the back surface of the bottom cover 114. These ear portions 114 project into the recess 115 formed at the lower end among the recess 115. Thus, the inverter 130 is mounted to correspond to the recess 115 formed at the lower end. Especially, the inverter 130 is mounted so that circuit parts mounted on the inverter PCB 132 and the corresponding recess 115 can face each other. Preferably, the inverter PCB 132 and the back surface of the bottom cover 114 have the same height.

Consequently, the transformer 134 occupying a large portion of the thickness of the inverter 130 is located within the recess 115, thus effectively preventing the problems of decrease in thinning and electromagnetic interference with a system module that have occurred due to the projection of the transformer 134. Here, to prevent the problem of electromagnetic interference with a system module more effectively, an insulation sheet 144 is attached to the inner wall surface of the bottom cover forming the recess 115. Further, since the inverter 130 is mounted to the underside of the back surface of the bottom cover 114 in a straight line, the mountable space of the system module greatly increases. Moreover, because the inverter 130 and the electrodes of the lamps 120 are not overlapped with each other, this prevents heat generation of the inverter 130. from being increased by lamp heat, thereby preventing a decrease inverter efficiency.

Figure 15:
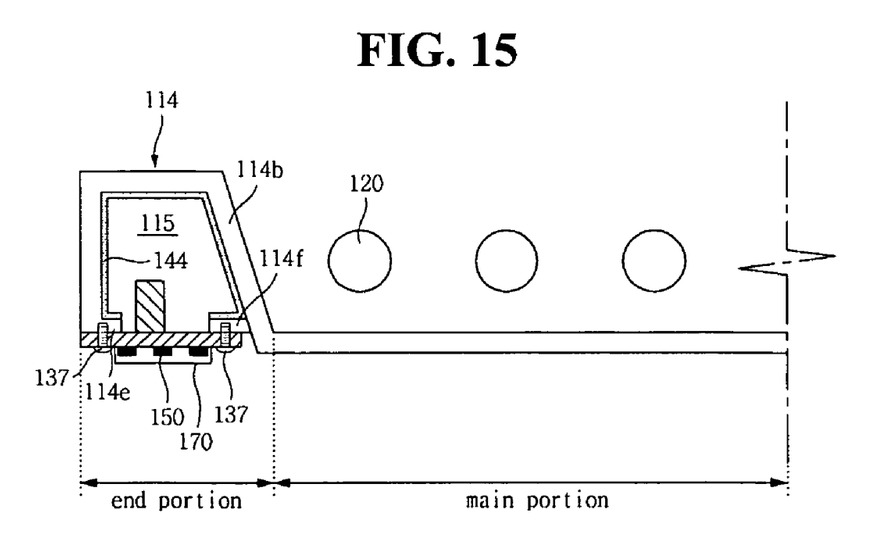
FIG. 15 is another cross-sectional view showing a coupling state between an inverter having two transformers and a bottom cover in accordance with an embodiment of the invention.

FIG. 15 is another cross-sectional view showing a coupling state between an inverter having two transformers and a bottom cover in accordance with an embodiment of the invention. As shown in FIG. 15, it may also be possible to mount the transformer 134 at one surface of the inverter PCB 132, mount other passive devices 150 on the other surface of the inverter PCB 132, and then locate only the transformer 134 within the recess 115 and make the passive devices 150 project toward the back surface of the bottom cover 114. In this case, a cover shield 170 may be further provided to protect the passive devices 150 projecting toward the back surface of the bottom cover 114. Even if the passive devices 150 project toward the back surface of the bottom cover 114 as described above, similar effects as those in FIGS. 13 and 14 can be obtained because the passive devices 150 do not occupy a large portion of the thickness of the inverter 130.

Figure 16:
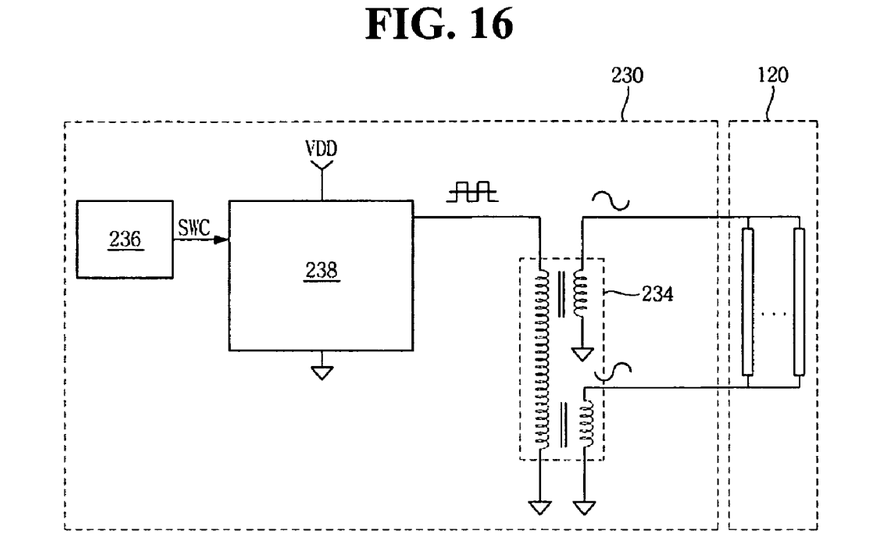
FIG. 16 is a schematic equivalent circuit diagram of an inverter having one transformer in accordance with an embodiment of the invention.
Figure 17:
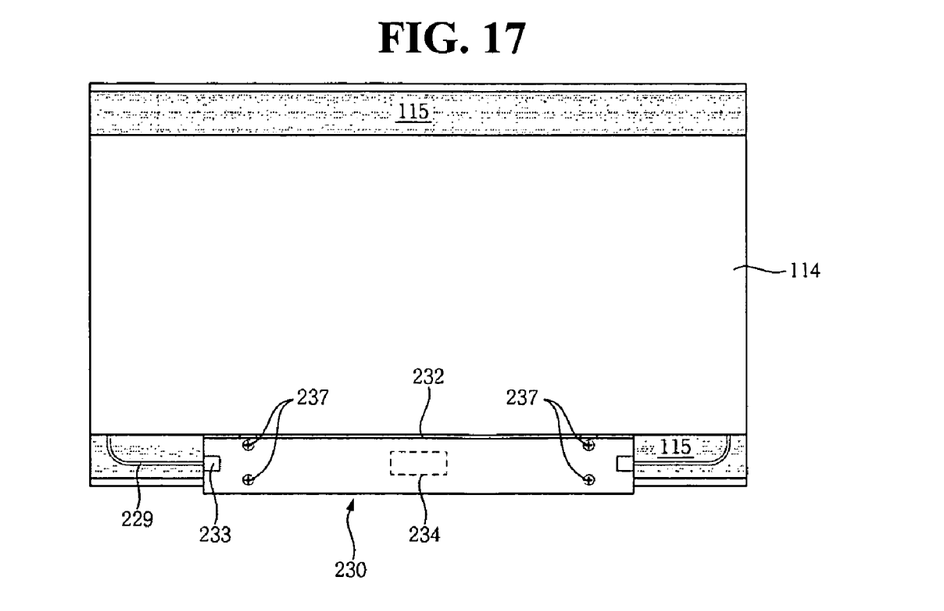
FIG. 17 is a plane view showing a coupling state between an inverter having one transformer and a bottom cover in accordance with an embodiment of the invention.

FIG. 16 is a schematic equivalent circuit diagram of an inverter having one transformer in accordance with an embodiment of the invention, and FIG. 17 is a plane view showing a coupling state between an inverter having one transformer and a bottom cover in accordance with an embodiment of the invention. On the other hand, in the liquid crystal display device in accordance with the invention, an inverter 230 having one transformer 234 as shown in FIGS. 16 and 17 can be used in place of the inverter having two transformers as noted above. This transformer 234 is implemented in a two-in-one transformer having a primary coil and two secondary coils wound in directions opposite to each other. This transformer 234 is mounted on the inverter PCB 232, and then located within the recess 115 at the lower end of the back surface of the bottom cover 114 by securing the inverter 230 and the bottom cover 114 by screws 237.

A lamp driving signal of a first phase is induced in the first secondary coil of the transformer 234, and a lamp driving signal of a second phase opposite to the first phase is induced in the second secondary coil of the transformer 234. The lamp driving signal of the first phase is supplied to one electrode of the lamps 120 via a connector 233 and a lamp wire 229, and the lamp driving signal of the second phase is supplied to the other electrodes of the lamps 120 via the connector 233 and the lamp wire 229. Here, to adjust the left and right balance of a driving current supplied to the lamps 120, the distance between the transformer 234 and one end portions of the lamps 120 and the distance between the transformer 234 and the other end portions of the lamps 120 should be equal to each other. A control unit 236 and switching unit 238 of FIG. 16 perform substantially the same functions as the control unit 136 and switching unit 138 as shown in FIGS. 11 and 12, so detailed descriptions thereof will be omitted.

As described above, the liquid crystal display device in accordance with an embodiment of the invention can significantly reduce the entire thickness of the product and greatly improve the left and right balance of a driving current supplied to the lamps by securing the inverter in a manner that the transformer having a relatively large volume can be located at an equal distance from the left and right end portions of the lamps in the recess of the back surface of the bottom cover. Furthermore, the liquid crystal display device in accordance with an embodiment of the invention can greatly enlarge the mountable space of a system module by securing the inverter to correspond to the recess formed along the long side of the lower end of the back surface of the bottom cover, and minimize electromagnetic interference between the system module and the inverter through an insulation sheet attached to the inner wall surface of the bottom cover forming the recess.

Moreover, the liquid crystal display device in accordance with an embodiment of the invention can greatly increase inverter efficiency by preventing heat generation of the inverter from being increased by lamp heat by securing the inverter to the back surface of the bottom cover not to be overlapped with the electrodes of the lamps.

It will be apparent to those skilled in the art that various modifications and variations can be made in a liquid crystal display device shown in the above embodiments of the invention without departing from the spirit or scope of the invention. Thus, it is intended that the invention cover the modifications and variations of this invention provided they come within the scope of the appended claims and their equivalents.

What is claimed is:

1. A liquid crystal display device, comprising:
a liquid crystal display panel;
a plurality of light sources for irradiating onto the liquid crystal display panel;
at least two electrode boards at ends of each of the light sources for electrically connecting the light sources;
an inverter board aligned parallel to the light sources for providing drive signals to the light sources through the electrode boards; and
a cover for accommodating the liquid crystal display panel, the light sources and the electrode boards on a first side thereof and for accommodating the inverter board on a second side thereof such that the inverter board is substantially on a same plane as a main portion of the cover, wherein the inverter board is formed at an end portion of the cover, and the cover includes a recess formed along a long side of the cover, the recess protruding toward the liquid crystal display panel for accommodating the inverter board within the recess.

2. The liquid crystal display device according to claim 1, further comprising:
at least one diffusion plate and an optical sheet between the liquid crystal display panel and the light sources, wherein the diffusion plate and the optical sheet correspond to the main portion of the cover.

3. The liquid crystal display device according to claim 1, further comprising:
an insulating sheet along internal walls of the recess.

4. The liquid crystal display device according to claim 1, wherein the inverter board includes a first transformer located at an end portion of the inverter board and a second transformer located at another end portion of the inverter board.

5. The liquid crystal display device according to claim 4, wherein the first and second transformers are connected parallel to one another or connected serially to one another.

6. The liquid crystal display device according to claim 4, wherein the first and second transformers include outer core legs in one of "U"-like shape, "E"-like shape and "I"-like shape.

7. The liquid crystal display device according to claim 1, wherein the inverter board includes one transformer located at a center of the inverter board.

8. The liquid crystal display device according to claim 7, wherein the transformer includes outer core legs in one of "U"-like shape, "E"-like shape and "I"-like shape.

9. The liquid crystal display device according to claim 1, further comprising a plurality of balancing capacitors or transformers on the electrode boards for providing a same driving power to the light sources.

10. The liquid crystal display device according to claim 1, further comprising:
a first wire for connecting one of the electrode boards to an end portion of the inverter board; and a second wire for connecting another of the electrode boards to another end portion of the inverter board.

11. The liquid crystal display device according to claim 10, further comprising:
a plurality of electrical connectors at ends of the electrode boards and the inverter board, wherein the first and second wires connect the electrode boards and the inverter board via the electrical connectors.

12. The liquid crystal display device according to claim 10, further comprising a plurality of supports on the cover for supporting the wires.

13. A backlight device for a flat panel display, comprising:
a plurality of light sources generating light irradiated onto the flat panel display;
at least two electrode boards at ends of each of the light sources for electrically connecting the light sources;
an inverter board aligned parallel to the light sources for providing drive signals to the light sources through the electrode boards;
a cover for accommodating the flat panel display, the light sources and the electrode boards on a first side thereof and for accommodating the inverter board on a second side thereof such that the inverter board is substantially on a same plane as a main portion of the cover, wherein the inverter board is formed at an end portion of the cover, and the cover includes a recess formed along a long side of the cover, the recess protruding toward the liquid crystal display panel for accommodating the inverter board within the recess.

14. The backlight device according to claim 13, further comprising:
at least one diffusion plate and an optical sheet between the flat panel display and the light sources, wherein the diffusion plate and the optical sheet correspond to the main portion of the cover.

15. The backlight device according to claim 13, further comprising:
an insulating sheet along internal walls of the recess.

16. The backlight device according to claim 13, wherein the inverter board includes a first transformer located at an end portion of the inverter board and a second transformer located at another end portion of the inverter board.

17. The backlight device according to claim 13, wherein the inverter board includes one transformer located at a center of the inverter board.

18. The backlight device according to claim 13, further comprising:
a first wire for connecting one of the electrode boards to an end portion of the inverter board; and
a second wire for connecting another of the electrode boards to another end portion of the inverter board.

19. The backlight device according to claim 13, further comprising:
a plurality of electrical connectors at ends of the electrode boards and the inverter board, wherein the first and second wires connect the electrode boards and the inverter board via the electrical connectors.

20. The backlight device according to claim 13, further comprising a plurality of supports on the cover for supporting the wires.

* * * * *